Nov. 26, 1957 V. L. JONES 2,814,231
CHANGEABLE CHORD FINDER
Filed June 25, 1953 3 Sheets-Sheet 1

Vernon L. Jones
INVENTOR.

Nov. 26, 1957  V. L. JONES  2,814,231
CHANGEABLE CHORD FINDER
Filed June 25, 1953  3 Sheets-Sheet 2
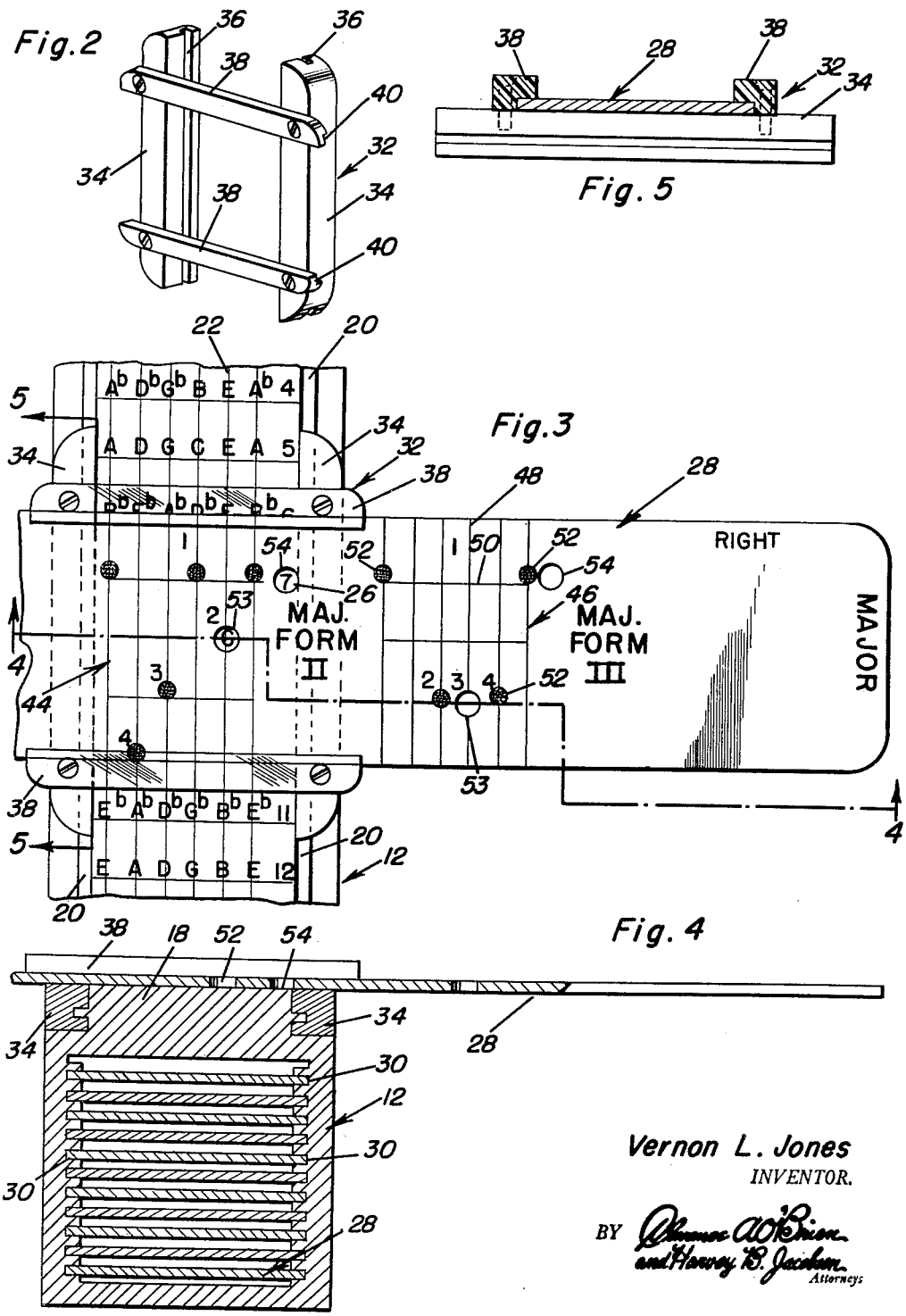
Vernon L. Jones
INVENTOR.

Nov. 26, 1957 V. L. JONES 2,814,231
CHANGEABLE CHORD FINDER
Filed June 25, 1953 3 Sheets-Sheet 3
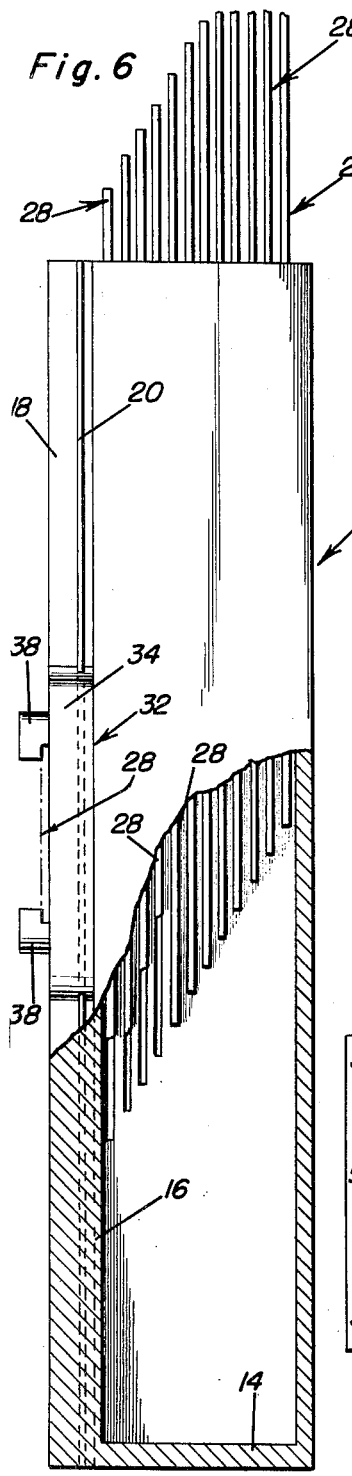
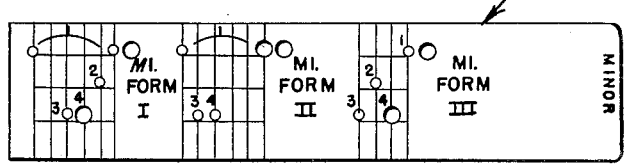
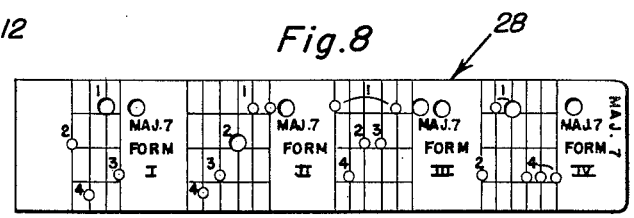
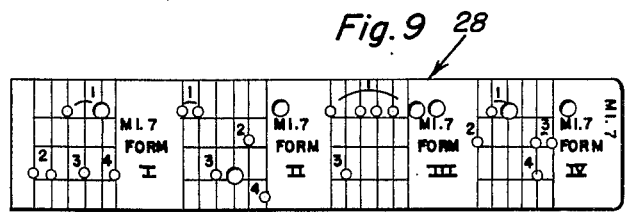
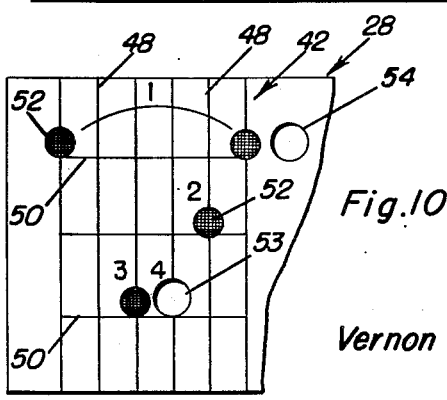
Vernon L. Jones
INVENTOR.
BY *Clarence A. O'Brien*
*and Harvey B. Jackson*
Attorneys United States Patent Office 2,814,231
Patented Nov. 26, 1957

2,814,231

CHANGEABLE CHORD FINDER

Vernon L. Jones, Bozeman, Mont.

Application June 25, 1953, Serial No. 363,996

4 Claims. (Cl. 84—485)

The present invention relates to certain new and useful improvements in a handy and readily usable device through the medium of which it is possible for teachers, students, amateur and professional musicians and others to acquaint themselves with most chords used in modern harmony and, what is just as important, with the fingerings applicable to any given-chord, for instance, on and in connection with a guitar.

In connection with the preceding statement and, in order that the reader will be better prepared to comprehend the over-all aspects of the concept, it is to be explained here that while the embodiment of the invention herein revealed is that which lends itself for use by those concerned with chord instruction and information relative to a guitar, the same sort of a construction may be used, obviously, for similar stringed and fretted musical instruments, namely, banjos, mandolins, ukuleles and the like.

Another object of the invention has to do with an expeditiously usable simple, compact, and practical device which may be said to resemble, generally speaking, a slide rule and the construction of which permits the user to quickly select and familiarize himself with the notes which go to make up any given chord, with the positions of the fingers in reference to the strings and frets, with the fret number on the finger-board and with the letter symbol which is the letter name of the chord and also root of the chord under consideration at any given setting and use of the device.

It is another objective to provide a highly efficient and reliable changeable chord finder whose varying findings serve to indicate many movable chord combinations, for example, forty-six chord positions for each of the seventeen normal frets present on a standard guitar finger-board and making it possible, therefore, to supply the user with information having to do with approximately six hundred ninety recognized chords.

More specifically, the preferred embodiment of the invention has to do with a chord finder characterized by an elongated base having a dummy finger-board provided with spaced parallel longitudinal lines representing strings and transverse lines crossing said longitudinal lines and representing frets, a carriage slidably mounted on said finger-board, and an insertable and removable slide adjustably and removably mounted on said carriage and disposed at right angles to and having a portion slidingly overlapping said finger-board, said slide comprising a flat-faced slat having cooperating lines on its obverse face representing strings and frets and selectively alignable with said first named strings and frets.

Further, novelty is predicated on the construction mentioned wherein certain of the string-designating lines on the slide are provided with prominent black or equivalent spots or marks which denote the finger placement positions in reference to the strings and frets and also show the numbers of the fingers which are placed thereon and there being at least one peep hole in association with this group of string and fret lines with the peep hole registerable with one of the string lines on the finger-board as well as the letter symbol which then appears through the hole furnishing the observer the name or clue to the chord which has been selected, that is, whether the chord is major, minor, dominant 7th, augmented, and so on.

In addition, novelty is predicated on the use of a base which is in the form of a hollow substantially rectangular box which is closed at the bottom and open at the top and which provides a sort of a magazine in which the various charted slides are systematically racked for handy use when not in active use.

Other objects, features and advantages will become more readily apparent from the following description and the accompanying sheet of illustrative drawings.

In the drawings, wherein like numerals are employed to designate like parts throughout the same:

Figure 2 is a perspective view of a unit of the over-all assembly which is referred to as a shiftable or slidable carriage;

Figure 3 is an enlarged fragmentary view in plan or elevation which shows with greater particularity how the slide may be worked from left to right in the carriage to bring about an expected chord indicating result;

Figure 4 is a section on the line 4—4 of Figure 3, looking in the direction of the arrows;

Figure 5 is a section through the assemblage at the left in Figure 3 taken on the line 5—5 of Figure 3, and looking in the direction of the arrows;

Figure 6 is a side view of the over-all device seen in Figure 1 with a portion broken away to show the details of construction;

Figures 7, 8 and 9 are plan views showing examples of several of the slides and also showing the common character of the printed or other displayed information thereon; and, Figure 10 is an enlarged view of one end of one slide which serves to bring out the exact make-up of one of the components on the slide which is referred to as chord finding and indicating media.

Figure 1:
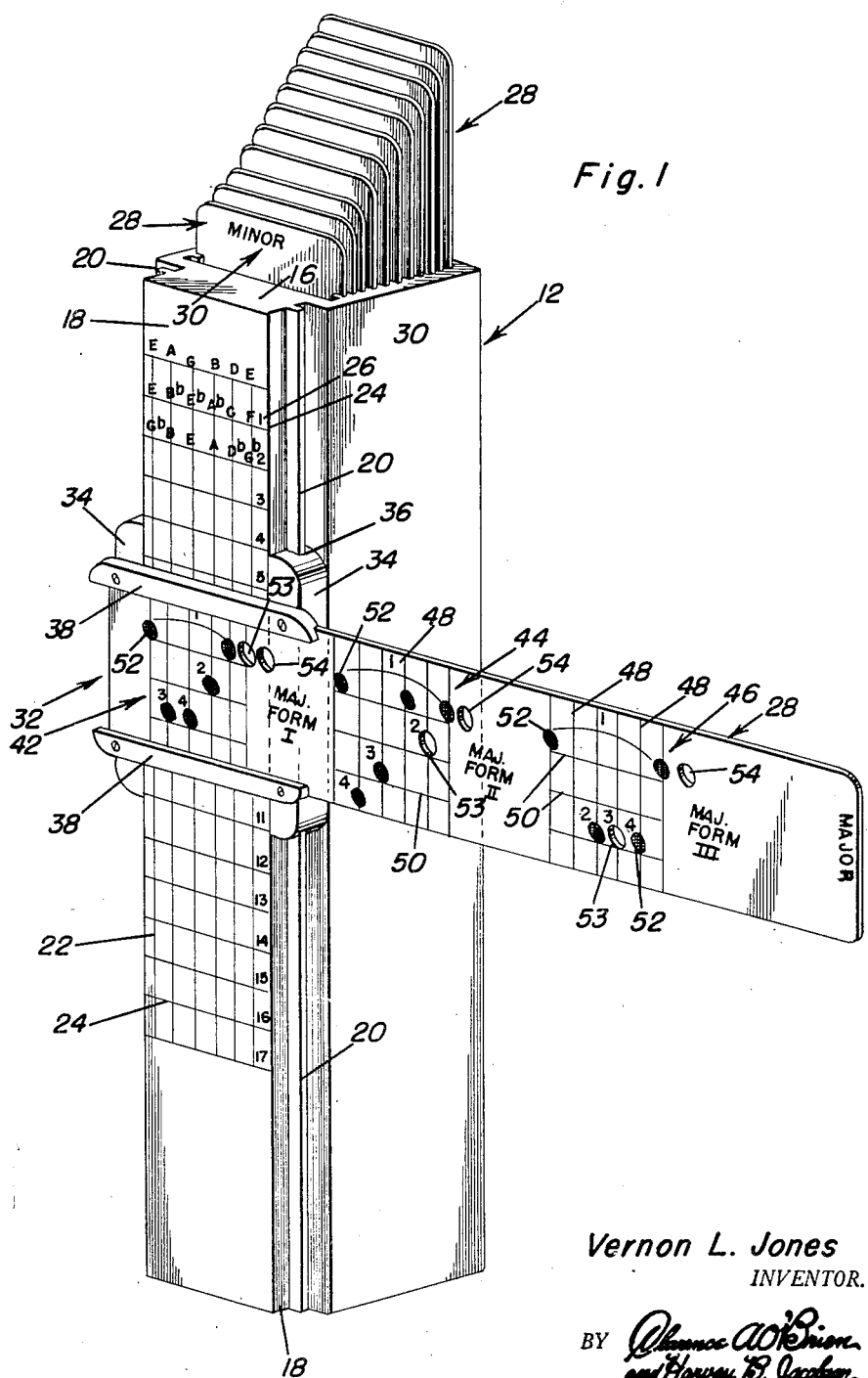
Figure 1 is a perspective view of a changeable chord finder constructed in accordance with the principles of the present invention and showing the details of construction and the manner in which the same is actually used.

Referring now to the drawings by-way-of reference numerals, the hollow elongate base is denoted by the numeral 12. This has sometimes been referred to as a box and it is, of course, constructed of appropriate material and it is closed at the bottom as at 14 (see Figure 6) and open at the top. It has several flat walls and the front wall is the important one and this is denoted by the numeral 16. It will be noticed in Figures 4, 6 and 1 that this front wall is increased in thickness and defines a lengthwise riser 18 which is narrower than the box proper and which is provided along longitudinal edges with outstanding ribs defining keys 20—20. This riser 18 is hereinafter identified as an imitation or dummy guitar finger-board. To better achieve this result, the face of the finger-board is provided, in any suitable manner, with spaced parallel longitudinal lines 22 which represent strings and horizontal or transverse longitudinally spaced lines 24 which represent frets. It will be noticed along the right-hand margin in Figure 1 that the frets have numbers appearing thereon as at 26. These are consecutively run to designate the usual seventeen frets on the finger-board. The alphabetical letters appearing at the top in Figure 1 in alignment with the strings have the function of naming, of course, the strings such as, for example, E, A, G, and so on. In addition, there are similar alphabetical letters which cooperate with the point of intersection of each string and fret to designate the particular tone which is made when the string is pressed down by the finger at that fret. For example, in Figure 1 and going horizontally there are the tones F, B-flat, E-flat and so on. All the strings and frets are so marked as brought out more advantageously in the enlarged view in Figure 3. In any event, we have here a hollow box with an imitation finger-board having ribs along the longitudinal edges. The space in the box serves as a case or magazine for plurality of readily insertable and removable slides. Although there are actually twelve slides herein shown and despite the fact that each is an individual instrumentality in and of itself, each slide is basically the same and it is felt that it is simpler to describe all of the slides as rigid insertable and removable slats or perhaps paddles inasmuch as they tend to represent a wooden paddle. In any event, all of the slides are denoted by the numerals 28 and each one has common characteristics as will be later described. For the time being it is to be noted that in Figure 6 opposite walls, interiorly considered, are provided with spaced parallel elongated grooves forming guideways 30 for the slides. The slides are fitted into their properly paired grooves and it will be seen that the grooves are terminated on different planes so that the slides are thus racked in easily available positions. That is to say, the upper projecting ends of the slides are arranged together in slanting relationship so that they are not only accessible but it is easy to read the legend or caption 30 on each slide. This systematic magazine or racking feature is, of course, important. Before discussing the data which is printed or displayed on the respective slides 28 and other particulars, I will continue with the broader structure aspects and, therefore, call attention to the fact that when a slide is taken from a box or magazine, it is then applied for cooperation with the guitar finger-board in order to acquaint the user with a particular chord and fingering particulars etc. This means, therefore, that a suitable device is employed for detachably and attachably associating the slide with the finger-board so that it extends at right angles thereto as shown for example in Figures 1 and 3. To accomplish this it has been found advisable to employ a simple carrier which is here referred to as a carriage and is denoted generally by the numeral 32. The carriage is made up of a pair of spaced parallel sliding blocks 34—34 which may be conveniently referred to as shoes. These shoes slide along in contact with the longitudinal edges of the finger-board and they are grooved as at 36—36 and consequently they are keyed by-way-of the keying ribs on the finger-board. The cross-pieces 38—38 are appropriately of transparent rigid material and they join the shoes together and they in turn are formed with grooves 40—40 and are consequently conveniently designated as track members. Consequently, the carriage is made up of slidably mounted shoes and track members. The track members serve to accommodate the insertable and removable slides. All of the slides are basically the same and for convenience each slide has several distinctly lined areas or regions thereon and each region is a separate chord finder. That is to say, on each slide are several selectively usable chord finders and these are conveniently denoted by the numerals (see Figure 1) 42, 44 and 46. Each finder is the same in make-up and actually is a sort of auxiliary finger-board which overlaps and constitutes a continuation or part of the already-mentioned finger-board. More specifically and with reference to Figure 10, each finder comprises spaced parallel "string" lines or lines which represent strings and these are denoted by the numerals 48. Then, there are cross-lines 50 and these represent the frets. The spots or finger-markers are denoted at 52 and these occur at the proper places at the juncture of the fret lines and string lines 50 and 48 as shown. The numbers 1, 2, 3, 4, are to indicate the fingers which are involved in the fingering of the chord which is designated or indicated at the time. There is a first peep hole 53 which forms a sort of a window to show the name letter of the chord therethrough as brought out, for example, in Figure 3. There is a second peep hole 54 to the right and this registers with the fret number as shown also in Figure 3. In Figure 3 we see the peep hole 53 showing the letter C indicating the C Major chord and in the same Figure we see "7" appearing through the peep hole 54 indicating that the slide is then in association with the 7th fret on the guitar finger-board.

The basic plan or charting of the finders on each slide is obviously the same and it seems to be unnecessary to go into too much detail about this aspect of the invention. It is to be repeated, however, that there are twelve plates or slides in the rack to start with and one slide is taken out at a time according to the use thereof and is placed and slid back and forth in the carriage as the carriage is in turn slid up and down or back and forth on the finger-board. There is one plate for each of the chords identified as major, minor, dominant 7th, major 7th, minor 7th, diminished, augmented and so on. All of the information is, of course, carefully planned and figured out so that it will be systematic and proper for each slide.

Briefly, in operating the device all that is necessary is to select a plate or slide from the album or magazine and to insert the slide from right to left in the shiftable carriage. It is then lined up with the strings on the slide registering with the strings on the finger-board. The first peep hole in the slide shows the name of the chord and the other hole shows the number of the fret. All that is necessary is to move the slide to the desired key or chord.

This chord device shows exactly the name of every chord, automatically, plus the exact fret to be played on. In addition it shows the correct place for every finger to be placed to execute such chord. Also, the forms follow each other in inversion rotation; for instance, the first plate in file shows three major forms. For a clearer understanding place plate in slide to form number 1 on the 1st fret, it shows the letter C which means C chord (form No. 1). Now, take the plate over to the next form (insert to left), slide up to the 5th fret or where the No. 3 is shown at right of form. You now have C chord again inverted or with a different "top" or melody note. To get your next C Major chord higher on the finger-board, merely insert to left again to No. 3 form. This time the C chord appears on the 8th fret. Now withdraw plate No. 1 form again and slide up to 12 fret. This gives a new C chord or one octave higher than the first position.

This device is automatic in the fact that when in operation, only one note is visible; this note being the root of the chord; thus, when moved with the slide either way this note will appear showing the name of the chord at all positions. Also, this device shows the number of the fret which is being used on said chords.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a chord finder of the class described, a hollow base in the form of an elongate box rectangular in cross-section, open at one end, and closed at the opposite end, opposed parallel walls of said box having their interior surfaces formed with pairs of aligned grooves and defining a slideway, a plurality of slides equal in length, each slide being in the form of an elongate rigid slat, said slats being mounted removably in their respective pairs of grooves, the inner ends of the grooves of the respective pairs being on varying planes whereby the upper ends of the slats are disposed in progressively available stepped relationship, one wall of said base being provided with an outstanding lengthwise riser defining an imitation finger-board and provided along opposite longitudinal edges with outstanding keying ribs, a longitudinally shiftable carriage embodying grooved members slidable on said ribs and track members carried by said grooved members bridging said fingerboard, said track members being grooved and transparent and serving to accommodatingly mount said slides for use in a position with a portion overlapping the finger-board and slidably mounted in said tracks so that it may be adjusted from left to right relative to the finger-board.

2. A chord finder comprising a portable elongated base provided along the top side thereof with a lengthwise rigid riser constituting a dummy finger-board, the latter being provided on its fingering surface with spaced parallel longitudinal lines representing strings and transverse lines crossing said longitudinal lines and representing frets, a carriage slidably and removably mounted on said riser, and a slide adjustably and removably mounted on said carriage and disposed at right angles to the lengthwise dimension of said riser and having a portion slidingly overlapping said riser, said slide comprising a non-transparent flat-faced elongated slat having a plurality of selectively usable individual longitudinally spaced chord finders, each chord finder being movable to a position on said carriage for alignable cooperation with the string lines and fret lines on said finger-board, and each finder being distinct as to information obtainable and comprising spaced parallel string lines registerable with said first string lines and cross-lines representing frets and therefore, registerable with the fret lines of said finger-board, and each finder also having two peep holes, one for alignment with the last named fret lines and the other one for alignment with one of the first named string lines.

3. A device of the class described comprising a portable elongated base in the form of a hollow box, said box being open at one end and closed at the opposite end, being adapted to serve as a storage rack for readily insertable and removable slat-like slides, opposed interior surfaces of opposed walls of said box being provided with pairs of aligned keying and storing grooves, the inner ends of the grooves adjacent the closed bottom of said box being likewise closed but being situated in stepped positions whereby the paired grooves are progressively shorter from the front wall toward the back wall of said box, a plurality of selectively usable slides removably keyed in their respective pairs of grooves, with the upper ends of the slides projecting progressively greater distances from the upper open end of said box so that the thus stepped and racked relationship assists in differentiating the slides and facilitating the steps of inserting and removing the same, the exterior surface of the front wall of said box being provided with an outstanding riser which is commensurate in length with the length of the box and which has its longitudinal edges disposed in spaced parallelism inwardly of the adjacent side walls of the box, said longitudinal edge portions having outstanding keying flanges also commensurate in length with the length of the riser, a readily applicable and removable carriage longitudinally shiftable along said riser and applicable to either end of the riser and likewise removable from either end of the riser, said carriage embodying grooved members which are slidable on said flanges, said grooved members carrying right angularly disposed spaced parallel track members which extend transversely across said riser and which are themselves grooved to permit the edge portions of any selected one of the slats to be adjustably mounted therein and so that the slide in use will be positioned at right angles to the lengthwise dimension of said riser.

4. The structure defined in claim 3 and wherein the surface of said riser has means thereon transforming said surface into a dummy key-board, and wherein the usable surface of each slide is provided with means cooperable with the means on said keyboard to furnish certain predetermined information depending on the position of the slide relative to the means on the keyboard and each slide having peep-holes for cooperation with the means on the keyboard.

References Cited in the file of this patent

UNITED STATES PATENTS

| | | |
|---|---|---|
| 482,442 | Roberson | Sept. 13, 1892 |
| 920,497 | Smith | May 4, 1909 |
| 1,014,344 | Smith | Jan. 9, 1912 |
| 1,300,193 | Raff | Apr. 8, 1919 |
| 1,364,154 | Stillman | Jan. 4, 1921 |
| 1,556,147 | Johnson et al. | Oct. 6, 1925 |
| 1,588,470 | Schumann | June 15, 1926 |
| 1,821,516 | Hohn | Sept. 1, 1931 |
| 2,001,191 | Golden | May 14, 1935 |
| 2,079,920 | Orzanda | May 11, 1937 |
| 2,502,300 | Young | Mar. 28, 1950 |

FOREIGN PATENTS

| | | |
|---|---|---|
| 252,364 | Switzerland | Oct. 1, 1948 |